(12) United States Patent
Hauss et al.

(10) Patent No.: US 9,382,952 B2
(45) Date of Patent: Jul. 5, 2016

(54) BALANCING ELEMENT AND METHOD FOR BALANCING A CLUTCH

(71) Applicant: Schaeffler Technologies GmbH & Co. KG, Herzogenaurach (DE)

(72) Inventors: Mario Hauss, Kehl-Leutesheim (DE); Stefan Steiger, Frankisch-Crumbach (DE); Holger Lietzenmaier, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/551,654

(22) Filed: Nov. 24, 2014

(65) Prior Publication Data

US 2015/0075938 A1 Mar. 19, 2015

Related U.S. Application Data

(63) Continuation of application No. PCT/EP2013/059591, filed on May 8, 2013.

(30) Foreign Application Priority Data

May 25, 2012 (DE) .......................... 10 2012 208 782

(51) Int. Cl.
*F16D 13/75* (2006.01)
*F16F 15/34* (2006.01)
*F16D 13/46* (2006.01)
*F16D 13/64* (2006.01)

(52) U.S. Cl.
CPC ................ *F16D 13/75* (2013.01); *F16D 13/46* (2013.01); *F16D 13/64* (2013.01); *F16F 15/34* (2013.01)

(58) Field of Classification Search
CPC .................................. F16F 15/32; F16F 15/34
See application file for complete search history.

(56) References Cited

U.S. PATENT DOCUMENTS

| 4,417,651 A | * 11/1983 | Lu ......................... F16D 13/585 192/112 |
| 5,743,691 A | 4/1998 | Donovan |
| 7,343,663 B2 | 3/2008 | Hodowanec et al. |

(Continued)

FOREIGN PATENT DOCUMENTS

| CN | 1853332 | 10/2006 |
| DE | 102009007829 A1 | 9/2009 |

(Continued)

OTHER PUBLICATIONS

Machine translation of DE 20200901516 downloaded from epo.org on Sep. 5, 2015.*

*Primary Examiner* — Richard Lorence
(74) *Attorney, Agent, or Firm* — Volpe and Koenig, P.C.

(57) ABSTRACT

A balancing element for balancing a clutch, including a shaft for inserting into a housing opening of a clutch cover, a head axially protruding from the shaft for limiting an insertion depth, and cutting edges radially protruding from the shaft for plastically deforming a wall surrounding the housing opening. A deforming stop is arranged at a distance from the cutting edges between the cutting edges and the head in order to plastically deform a part of the wall between the cutting edges and the deforming stop. By the plastic deformation of the wall into an area between the cutting edges and the deforming stop, the balancing element can be accommodated captively even under operating conditions without additional tools, whereby simple and economical production of an operationally reliable clutch is enabled.

9 Claims, 3 Drawing Sheets

(56) References Cited

U.S. PATENT DOCUMENTS

| | | | |
|---|---|---|---|
| 2008/0008589 A1* | 1/2008 | Lee | F01D 5/027 416/144 |
| 2009/0223773 A1* | 9/2009 | Ruehle | F16D 13/58 192/107 R |
| 2009/0229940 A1* | 9/2009 | Rathke | F16D 13/757 192/70.251 |
| 2011/0058942 A1* | 3/2011 | Belmonte | F01D 5/027 415/232 |

FOREIGN PATENT DOCUMENTS

| | | | |
|---|---|---|---|
| DE | 202009015716 U1 | 4/2010 | |
| GB | 2214999 A * | 9/1989 | F16D 13/58 |
| GB | 2250069 A * | 5/1992 | F16D 13/58 |

* cited by examiner

BALANCING ELEMENT AND METHOD FOR BALANCING A CLUTCH

INCORPORATION BY REFERENCE

The following documents are incorporated herein by reference as if fully set forth: International Application No. PCT/EP2013/059591, filed May 8, 2013; and German Patent Application No. 102012208782.6, filed May 25, 2012.

BACKGROUND

The invention relates to a balancing element as well as a method for balancing a clutch, by which a clutch can be balanced.

A clutch for coupling a drive shaft of an engine of a motor vehicle with at least one gearbox input shaft shows an imbalance, conditional to manufacturing. In order to compensate a specific imbalance of a clutch it is known to rivet balancing elements to the clutch at the appropriate positions.

There is a constant need for providing a dependable clutch in a simple and cost-effective fashion.

SUMMARY

The objective of the invention is to provide measures allowing a simple and cost-effective production of a dependable clutch.

The objective is attained according to the invention in a balancing element having one or more features of the invention as well as by a method for balancing a clutch including one or more features of the invention. Preferred embodiments of the invention are disclosed below and in the claims, each of which may represent an aspect of the invention individually or in combination.

According to the invention a balancing element is provided for balancing a clutch with a shaft to be inserted into a housing opening of a clutch cover, a head axially projecting from the shaft for limiting the insertion depth, and cutting edges projecting radially from the shaft, for a plastic deformation of a wall surrounding the housing opening, with a deforming stop being arranged between the cutting edges and the head, spaced from the cutting edges, for the plastic deformation of a portion of the wall between the cutting edges and the deforming stop.

By the balancing element, which can be connected to the clutch cover or another part of the clutch, the clutch can be balanced so that the dynamic stress of the clutch during operation can be reduced and a dependable operation of the clutch can be achieved with an increased life span. With the help of the cutting edges projecting from the shaft of the balancing element, the balancing element can cut into the clutch cover and this way form a force-fitting connection with a high fastening force. The grooves that are cut into the wall by the cutting edges at the axial side facing the head of the balancing element can be closed, at least partially, such that the part of the wall of the deformation projection remaining between the grooves is plastically deformed at the end of the insertion process of the balancing element into the housing opening. The deforming stop can particularly be driven into the wall, at least partially, causing the material of the wall, plastically deformed by the deforming stop, to deflect in an area between the cutting edges and the deforming stop. The material of the clutch cover deformed by the deforming stop can this way seal the grooves in the wall formed by the cutting edges, so that an axial fastening is formed and the balancing element is held captive in the housing opening. In the event of an axial force acting along the direction of insertion upon the balancing element the head of the balancing element can impact the contact area at the clutch cover and block any motion of the balancing element. In the event of an axial force acting opposite the direction of insertion upon the balancing element the cutting edges can impact the wall of the material plastically deformed by the cutting edges, also resulting in any motion of the balancing element being blocked. The balancing element is therefore prevented from exiting the housing opening, even under vibrations developing when the clutch is in operation, and damaging for example a clutch bell surrounding the clutch. Due to the plastic deformation of the wall in an area between the cutting edges and the deforming stop, the balancing element can be received captive without any additional tools, even under operating conditions, allowing a simple and cost-effective production of a dependable clutch.

Contrary to riveting the balancing element, here no plastic deformation of the balancing element occurs, rather a plastic deformation takes place of the wall surrounding the balancing element in the inserted state. For this purpose, the balancing element shows particularly a stronger hardness than the wall. The wall may be more ductile than the balancing element. The balancing element may this way be received in the wall in a form-fitting and/or captive fashion. Contrary to riveting the balancing element, here a plastic deformation occurs not outside the housing opening but inside said housing opening. The material, plastically deformed by the deforming stop, may embody an axial safety of the balancing element, so that no additional axial safety is required by a plastically deformed swage head of a rivet connection or an adhesive layer between the balancing element and the clutch cover. Preferably, the balancing element is fixed captive exclusively by the plastic deformations of the wall caused by the balancing element. Due to the fact that it is not necessary to counter the balancing element with another component, here no tool is required, by which the countering and the axial fixation must be performed. The assembly is therefore simplified. In particular the balancing element can be used for balancing a clutch for a motor vehicle for the purpose of connecting the balancing element to the clutch in a captive fashion by applying a force exclusively from precisely one direction. This way the balancing element can also be provided at locations where easy accessibility is not possible from a rear of the clutch cover pointing in the direction of insertion. For example, the balancing element can be used for a clutch, particularly a duplex clutch, which comprises wear compensation with at least one, preferably two adjustment rings gliding down a ramp, allowing to position the adjustment ring on a common radius in the axial direction of the clutch adjacent to the balancing element. Further, the balancing element can be easily positioned on a comparatively large radius so that an appropriately lower inert mass is necessary to provide a defined mass moment of inertia, thus allowing to reduce the overall weight of the clutch and the material costs.

By sizing the distance between the end of the cutting edges opposite the direction of insertion and the contact surface of the deforming stop facing in the direction of insertion as well as the distance between the stop areas of the deforming stop and the stop area of the head the size and/or the design of the material of the wall plastically deformed by the deforming stop can be adjusted. The greater the distances are selected, the more material of the wall can be plastically deformed by the deforming stop in order to form a particularly safe axial position. The shorter the distances are selected the less material of the wall can be plastically deformed by the deforming stop so that a lower deformation force is required when inserting the balancing element. When the distance between the end of the cutting edges and the stop areas is relatively short and the distance between the stop area and the contact area is selected relatively large the volume remaining between the end of the cutting edges and the stop area is largely filled with the plastically deformed material of the wall so that particularly the plastically deformed material can radially deflect inwardly to a relatively large extent in order to fill the grooves pointing away from the direction of insertion as completely as possible.

The diameter of the head and/or the diameter of the shaft are particularly selected such that they adjust a defined inert mass and/or a defined position of the center of gravity of the balancing element. The shaft can particularly have an insertion bevel at the end facing away from the head and facing in the direction of insertion, facilitating the insertion of the balancing element into the housing opening as well as the centering of the balancing element in the housing opening before the cutting edges perform a plastic deformation of the wall. In particular, preferably between the insertion bevel and the cutting edges, the shaft preferably comprises a centering area extending circumferentially, which embodies a play and/or transitional fitting, particularly with the housing opening. The cutting edges may be beveled particularly at their end facing in the direction of insertion in order to facilitate an automatic centering and/or to gradually increase the degree of plastic deformation over the length of the axial extension. For example, the exterior diameter of the cutting edges can gradually increase opposite the direction of insertion, with the nominal diameter of the cutting edges being understood as the maximally possible exterior diameter. The cutting edges and the tracks formed between the cutting edges can be produced in a cost-effective manner particularly by massive deformation of the balancing element, particularly the shaft.

In particular, a circumferential groove is formed between the cutting edges and the deforming stop, with particularly the groove at the axial side allocated to the head being limited by the deforming stop. The groove may be filled partially or almost completely with the material of the wall plastically deformed by the deforming stop, so that here a captive connection develops. In particular, the groove is sized such that the material of the wall pressed into the groove is essentially deformed completely in the circumferential direction. Preferably the groove is sized such that the material of the wall pressed into the groove fills said groove in the axial direction. This means that the material of the wall pressed into the groove can at least partially contact the groove at both axial sides in the circumferential direction. Preferably, one axial side of the groove may be formed at least partially by the axial ends of the cutting ends facing away from the direction of insertion and/or the other axial side of the groove by the contact area of the deforming stop.

Preferably the groove shows a groove base extending in the radial direction with a diameter $D_N$, with tracks being formed between the cutting edges, and the tracks have a track base extending in the radial direction with a diameter $D_B$, with it applying for the ratio of $D_N/D_B$ $0.90 \leq D_N/D_B \leq 1.00$, particularly $0.95 \leq D_N/D_B \leq 0.99$, and preferably $0.97 \leq D_N/D_B \leq 0.98$. The base of the groove may be equivalent to the base of the tracks, embodied between the cutting edges and particularly extending essentially axially, or be embodied slightly lower in reference to said base of the tracks. This allows that the entire cross-sectional area of the grooves cut by the cutting edges into the wall can be closed essentially entirely by the material of the wall plastically deformed by the deforming stop. The diameter of the base of the groove can be selected in reference to the diameter of the base of the groove in consideration of the elastic portion of the deformation of the material deformed by the deforming stop such that even after an elastic recovery the plastically deformed material of the wall can essentially cover completely the cross-sectional area of the grooves.

Particularly preferred, the deforming stop has an exterior diameter $D_V$ and the cutting edges have an exterior diameter $D_S$, with it applying for the ratio of $D_V/D_S$ $0.90 \leq D_V/D_S \leq 1.05$, particularly $0.95 \leq D_V/D_S \leq 1.03$, and preferably $D_V/D_S = 1.00 \pm 0.02$. This way, the exterior diameter of the deforming stop may essentially be equivalent to the exterior diameter of the cutting edges, so that the deforming stop essentially impacts the axial areas of the material of the wall remaining between the grooves formed by the cutting edges. The force applied by the balancing element via the deforming stop can this way be concentrated to a smaller area compared to a massive ring, so that here higher area compression results and thus the yield point of the material of the wall can be easier overcome in order to establish the plastic deformation of the wall.

In particular, the head has a contact area for the axial contacting at the clutch cover, with in the radial direction the contact area having a radial distance via a gap from the deforming stop. The contact area can particularly be positioned coaxially in reference to the deforming stop. The contact area is preferably embodied as a closed annual surface. By the gap the contact area can contact the clutch cover in an area which is distanced from a perhaps plastically deformed section of the wall radially outside the deforming stop. The axial end position of the compensation element is therefore not influenced by the plastic deformation of the wall of the deforming stop. The axial positioning of the compensation element and thus particularly the axial positioning of the center of gravity of the compensation element can occur with high precision in spite of the plastic deformation of a part of the clutch cover in the area of the wall of the housing opening.

The invention further relates to the use of a balancing element which, as described above, can be embodied and further developed for the balancing of a clutch of a motor vehicle for the purpose of connecting the balancing element in a captive fashion to the clutch by applying a force exclusively in precisely in one direction. By the plastic deformation of the wall in a section between the cutting edges and the deforming stop, here the balancing element can be received in a captive fashion without any additional tools even under operating conditions, allowing a simple and cost-effective production of a dependable clutch.

The invention further relates to a clutch cover arrangement for a clutch, particularly a duplex clutch with an adjustment device for each partial clutch, respectively comprising two adjustment rings, with a clutch cover, with the clutch cover comprising at least one housing opening limited by a wall, and with at least one balancing element inserted in the housing opening, which may be embodied and further developed as described above, with the balancing element being received in a captive fashion by a deformation of the wall caused by the deforming stop. By the plastic deformation of the wall in an area between the cutting edges and the deforming stop the balancing element can be received in a captive fashion without any additional tools, even under operating conditions, allowing a simple and cost-effective production of a dependable clutch.

In particular, the balancing element comprises a center of gravity located radially inside the wall of the clutch cover in the housing opening. This way it is avoided that during operation of the clutch by the centrifugal forces applied to the balancing element a lever momentum is applied to the balancing element, which applies a force in the axial direction upon the balancing element. This way any separation of the balancing element from the housing opening can be avoided. Further, fewer plastic deformation of the material deformed by the deforming stop is required in order to form sufficient axial security.

The invention further relates to a clutch for a drive shaft of a motor vehicle with at least one transmission input shaft of a motor vehicle transmission, comprising a counter plate, a compression plate that can be displaced in reference to the counter plate for a friction-fitting compression of a clutch disk between the counter plate and the compression plate, and a clutch cover arrangement, which may be embodied and further developed as described above, with particularly the shaft of the balancing element projecting into a plate opening of the counter plate. By the plastic deformation of the wall in an area between the cutting edges and the deforming stop the balancing element can be received in a captive fashion without additional tools even under operating conditions, allowing a simple and cost-effective production of a dependable clutch. Due to the fact that the balancing element requires no counter parts, it is possible to provide the balancing element at points of the clutch, which are not accessible or hardly accessible from the side facing away from the head of the balancing element. For example, the counter plate may have several plate openings each located opposite a housing opening of the clutch cover, with depending on the imbalance of the clutch one or more particularly suitable housing openings can be selected for positioning a balancing element with a defined weight, with particularly here various balancing elements with different weights may be used. The shaft of the respective balance element can here project into the respective plate openings, so that the shaft of the balance element cannot collide with other function elements of the clutch, particularly adjustment rings of a readjustment device adjusting a faulty distance of the compression plate from the counter plate, caused by wear and tear. Accordingly it is easily possible that the clutch comprises an adjustment device with particularly two adjustment rings for adjusting a faulty distance of the compression plate from the counter plate caused by wear and tear.

The invention further relates to a method for balancing a clutch, particularly a duplex clutch, with respectively one adjustment device for each partial clutch, each having two adjustment rings, in which a clutch being provided comprising a clutch cover, with the clutch cover having a housing opening limited by a wall, then a balancing element, which may particularly be embodied and further developed as described above, being inserted into the housing opening along a direction of insertion, particularly at the motor side, with the wall being plastically deformed by the balancing element such that the balancing element is held in the housing cover in a captive fashion. The method can be particularly embodied and further developed as explained above in the example of the balancing element. By the plastic deformation of the wall in the area between the cutting edges and the deforming stop the balancing element can be received in a captive fashion without any additional tools and even under operating conditions, allowing a simple and cost-effective production of a dependable clutch.

In particular during the insertion into the housing opening the balancing element initially cuts grooves into the wall, essentially extending axially, and subsequently the grooves are at least partially closed by the balancing element at an axial side facing away from the direction of insertion by a plastic deformation of the wall. The plastic deformation of the wall for the generation of the grooves, particularly by the cutting edges of the balancing element, on the one side, and the plastic deformation of the wall, on the other side, at least a partial closure of the grooves can occur successively, particularly by the deforming stop of the balancing element, on the other side, with her particularly the balancing element being driven continuously without interruptions into the housing opening of the clutch cover. This way, both plastic deformations can be performed in a single processing step.

BRIEF DESCRIPTION OF THE DRAWINGS

In the following the invention is explained with reference to the attached drawings based on preferred exemplary embodiments, and the following features shown may represent an aspect of the invention either individually or in combination. Shown are.

DETAILED DESCRIPTION OF THE PREFERRED EMBODIMENTS

Figure 1:
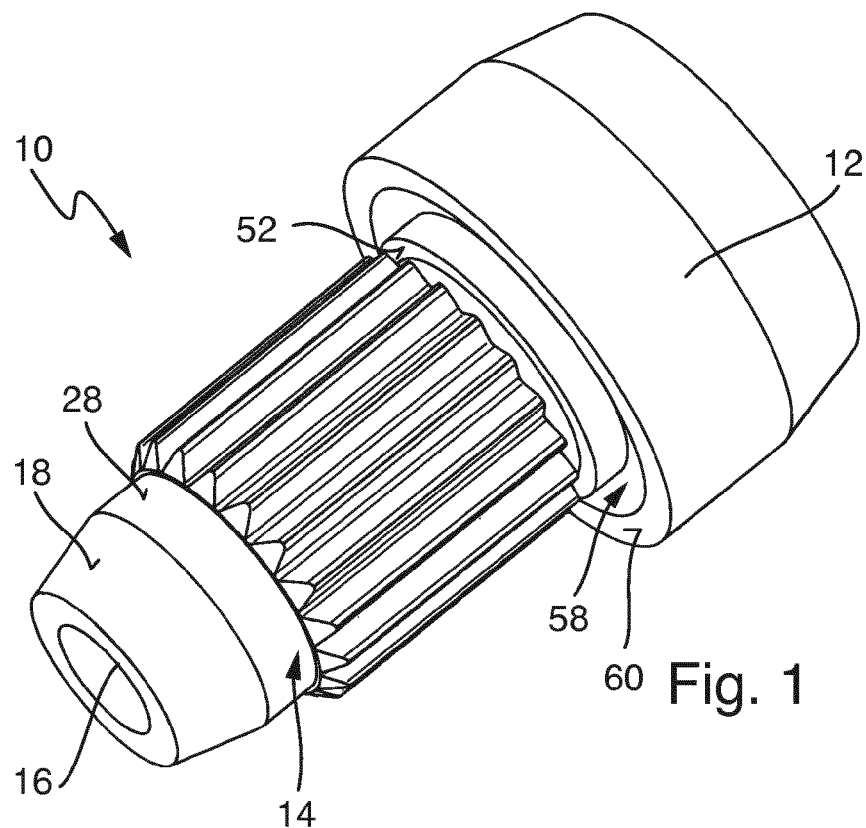
FIG. 1: a schematic perspective view of the balancing element.
Figure 2:
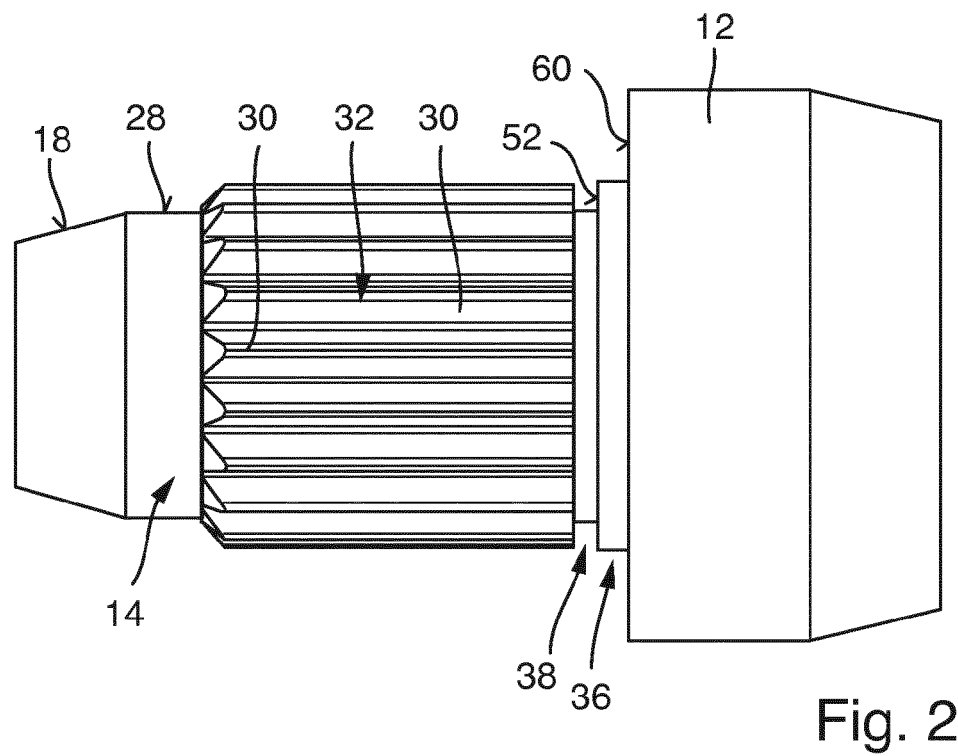
FIG. 2: a schematic side view of the balancing element of FIG. 1.

The balancing element 10 illustrated in FIGS. 1 and 2 shows a shaft 14 connected in one piece with a head 12, with the head 12 and/or the shaft 14 potentially including a recess 16 in order to allow adjusting the overall weight and/or the position of the center of gravity of the balancing element 10. The shaft 14 comprises at its end an insertion bevel 18 facing away from the head 12 in order to allow inserting the balancing element 10 easily into a housing opening 22, limited by a wall 20, of the clutch cover 24 or another component, particularly a clutch 26. A centering area 28 follows the insertion bevel 18, extending in the circumferential direction, by which a first centering of the balancing element 10 can occur in the housing opening 22. From the shaft 14, several cutting edges 30 project in the radial direction, that are essentially triangular in their cross-section, with tracks 32 being embodied between them, extending essentially axially. The cutting edges 30 may be chamfered in the axial direction in order to facilitate the centering of the balancing element 10 in the housing opening 22 and/or the cutting of grooves 34 into the wall 20. A deforming stop 36 is provided between the head 12 and the cutting edges 30, which is distanced from the cutting edges 30 by a notch 38 continuous in the circumferential direction.

Figure 3:
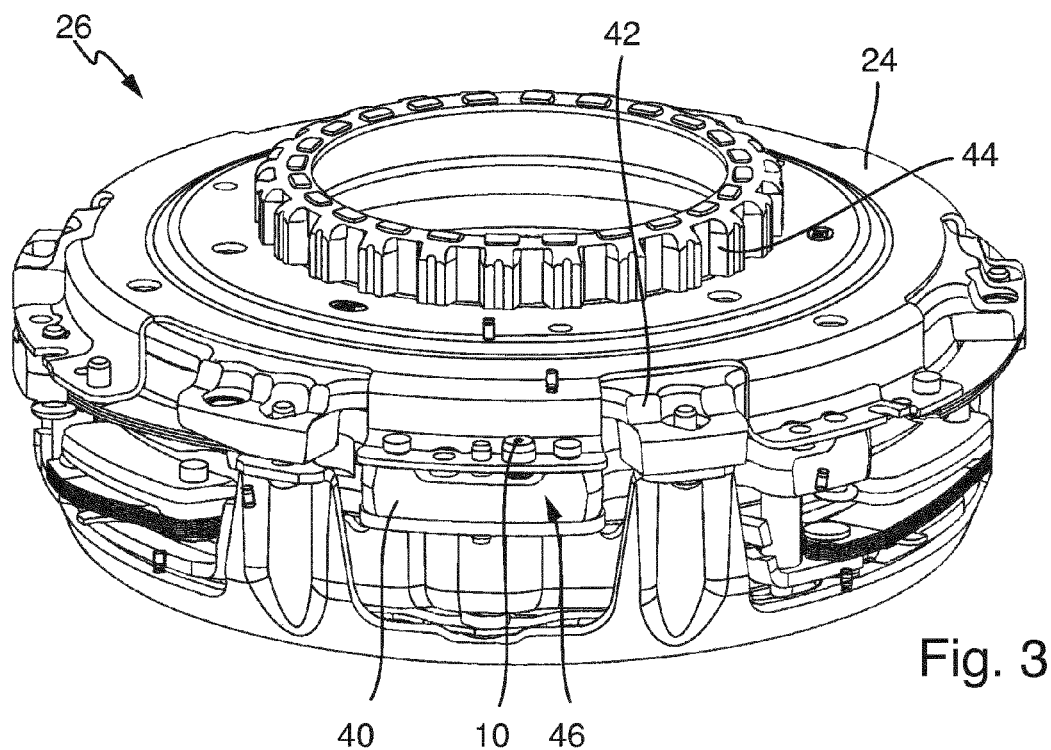
FIG. 3: a schematic perspective view of a duplex clutch with a balancing element of FIG. 1, FIG. 4: a schematic detail of the duplex clutch of FIG. 3, and FIG. 5: a schematic cross-section of a clutch cover arrangement shown in FIG. 4.

The balancing element 10 can be used for balancing the clutch 26 embodied as a duplex clutch shown in FIG. 3. The clutch 26 has a compression plate 42, displaceable in reference to a counter plate 40, for a friction-fitting compression of a clutch disk between the counter plate 40 and the compression plate 42, with the clutch cover 24 being connected to the counter plate 40. In the exemplary embodiment shown the clutch cover 24 is provided at the engine side and can be connected in a torque-proof fashion via splines 44, particularly with a torsional vibration damper, particularly a two-mass flywheel, which can be connected to a drive shaft of a motor vehicle. The clutch cover 24 can couple an output side of the torsional vibration damper with the counter plate 40 of the clutch 26, like a driving collar.

Figure 4:
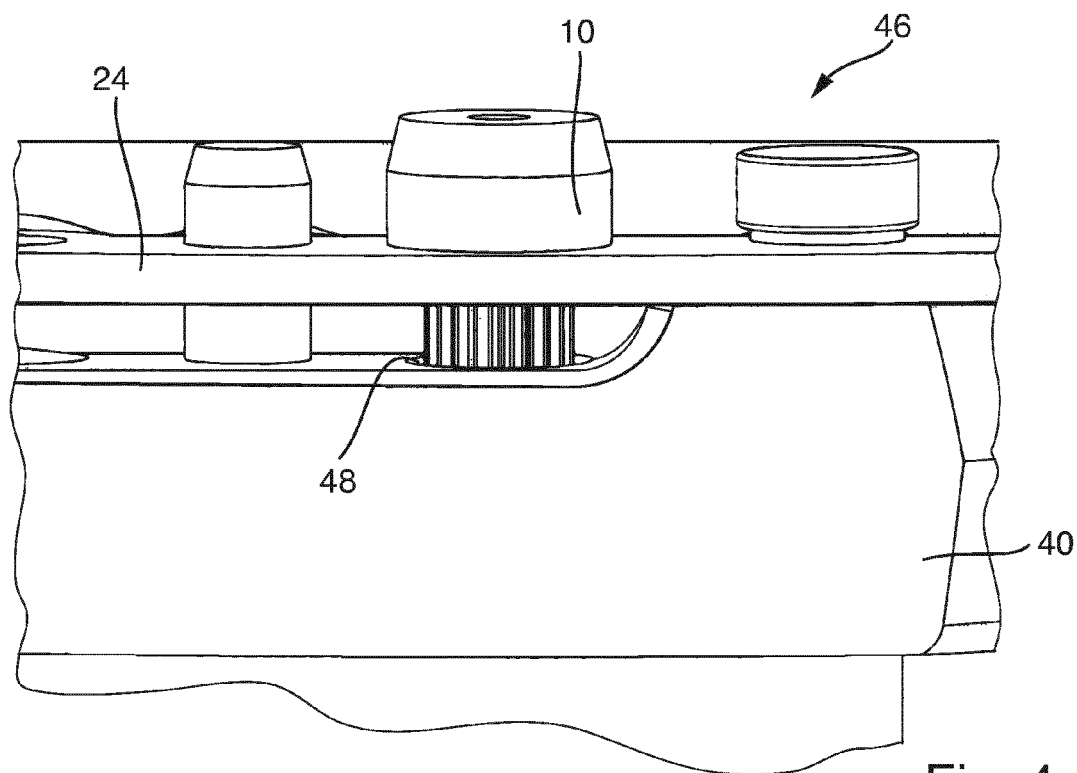

The clutch 26 comprises a clutch cover arrangement 46 shown in FIG. 4, with the balancing element 10 being inserted in its clutch cover 24. The shaft 14 of the balancing element 10 can project into a plate opening 48 of the counter plate 40 with a lot of play. The balancing element 10 is therefore not accessible from the transmission side.

Figure 5:
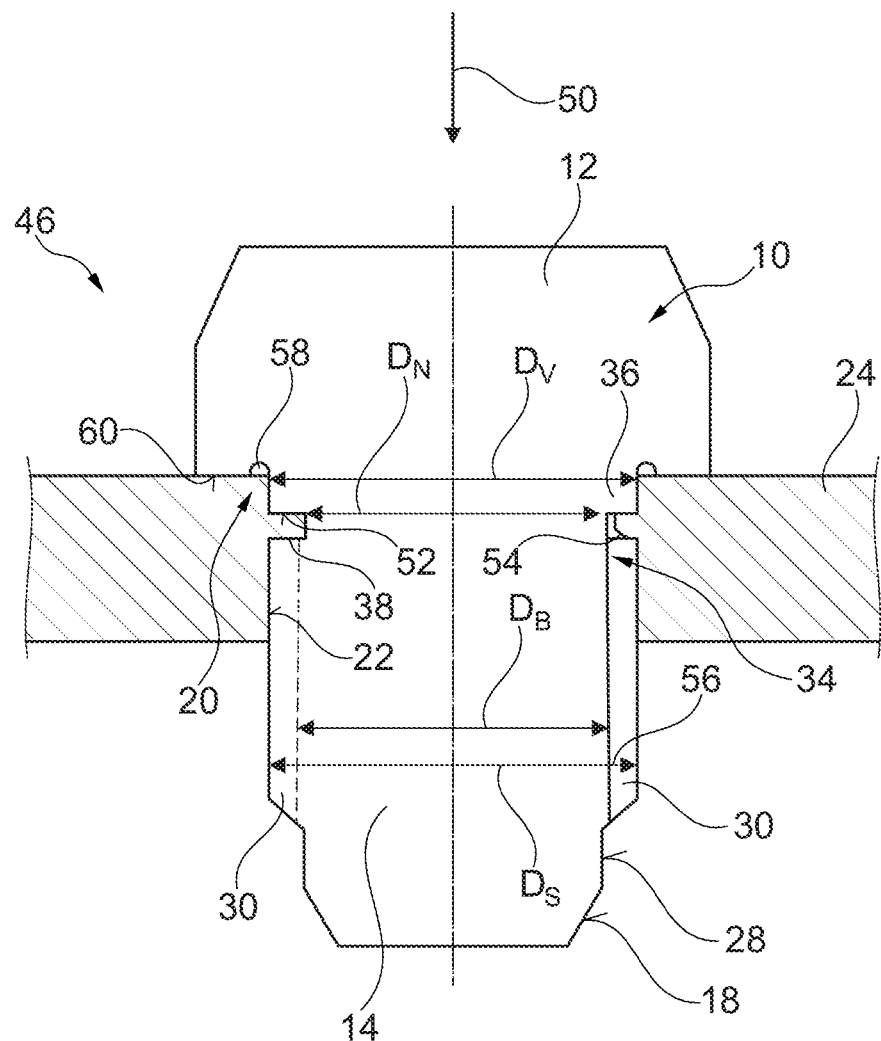

As shown in FIG. 5, the cutting edges 30 can cut the grooves 34 during an insertion of the balancing element 10 along a direction of insertion 50 into the housing opening 22 limited by the wall 20. Subsequently the deforming stop 36 can impact with a contact area 52 at the material of the wall remaining between the grooves 34 and deform this material plastically into the notch 38 so that the grooves 34 can be closed at the end facing the head 12 in order to form an axial fastening, which connects in a form-fitting fashion the balancing element 10 to the clutch cover 24 in a captive fashion. In order to allow accepting sufficient material, plastically deformed by the deforming stop 36, and particularly close completely the grooves 34, the notch 38 may include a notch bottom 54 with a smaller diameter than a track bottom 56 of the tracks 32 of the balancing element 10 embodied between the cutting edges 30. Another deformation of the wall 20 ends when the head 12 comes into contact with a contact area 60 at the clutch cover 24 spaced via an annular gap 58.

LIST OF REFERENCE CHARACTERS

10 Balancing element
12 Head
14 Shaft
16 Recess
18 Insertion bevel
20 Wall
22 Housing opening
24 Clutch cover
26 Clutch
28 Centering area
30 Cutting edges
32 Track
34 Groove
36 Deforming stop
38 Notch
40 Counter plate
42 Compression plate
44 Spline
46 Clutch cover arrangement
48 Plate opening
50 Direction of insertion
52 Contact area
65 Notch base
56 Track base
58 Gap
60 Contact area

The invention claimed is:

1. A balancing element for balancing a clutch comprising a shaft for inserting into a housing opening of a clutch cover, a head axially protruding from the shaft that limits an insertion depth, and cutting edges radially protruding from the shaft adapted to deform a wall surrounding the housing opening, a deforming stop arranged at a distance from the cutting edges located between the cutting edges and the head adapted to plastically deform a part of the wall between the cutting edges and the deforming stop, wherein the head comprises a contact area for an axial contact at a clutch cover, and the contact area is radially spaced via a gap from the deforming stop.

2. The balancing element according to claim 1, wherein a circumferential notch is provided between the cutting edges and the deforming stop, and the notch is limited by the deforming stop at an axial side allocated to the head.

3. The balancing element according to claim 2, wherein the notch comprises a notch base extending in an axial direction with a diameter $D_N$, and tracks are provided between the cutting edges, the tracks have a track base extending in a radial direction with a diameter $D_B$, wherein $0.90 \leq D_N/D_B \leq 1.00$.

4. The balancing element according to claim 1, wherein the deforming stop comprises an exterior diameter $D_V$ and the cutting edges have an exterior diameter $D_S$, wherein $0.90 \leq D_V/D_S \leq 1.05$.

5. A clutch cover arrangement for a clutch, comprising a clutch cover having at least one housing opening limited by a wall, and at least one balancing element according to claim 1 inserted in the housing opening, the balancing element being received in a captive fashion by a deformation of the wall formed by the deforming stop.

6. The clutch cover arrangement according to claim 5, wherein the balancing element has a center of gravity located radially inside the wall of the clutch cover in the housing opening.

7. A clutch for engaging a drive shaft of an engine of a motor vehicle with at least one transmission input shaft of a motor vehicle transmission, comprising a counter plate, a compression plate that is displaceable in reference to the counter plate for a friction-fitting compression of a clutch disk between the counter plate and the compression plate, and a clutch cover arrangement according to claim 5, and the shaft of the balancing element projects into a plate opening of the counter plate.

8. A method for balancing a clutch, comprising providing a clutch, comprising a clutch cover, with the clutch cover having a housing opening limited by a wall, subsequently inserting a balancing element according to claim 1 into the housing opening along a direction of insertion, with the wall being deformed by the balancing element such that the balancing element is held in the housing cover in a captive fashion.

9. The method according to claim 8, wherein the balancing element when inserted into the housing opening initially cuts grooves into the wall, essentially extending axially, and the method subsequently comprises at least partially closing the grooves at an axial side facing away from a direction of insertion by a plastic deformation of the wall by the balancing element.

* * * * *